Dec. 21, 1948.  A. PETERSON  2,457,068
ANTISKID CHAIN
Filed April 16, 1947
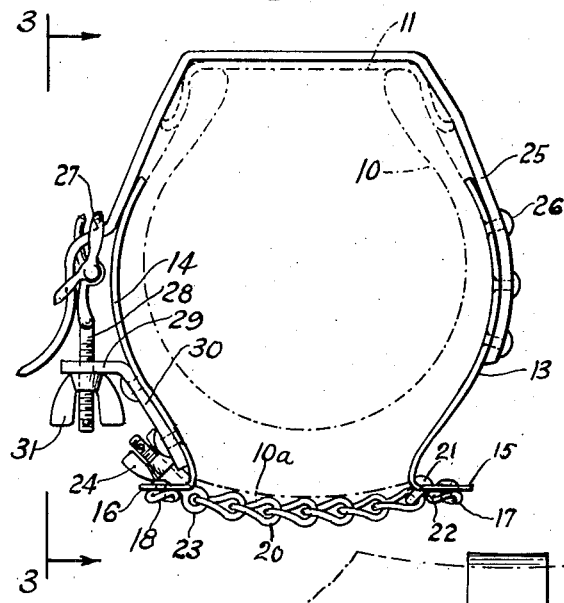
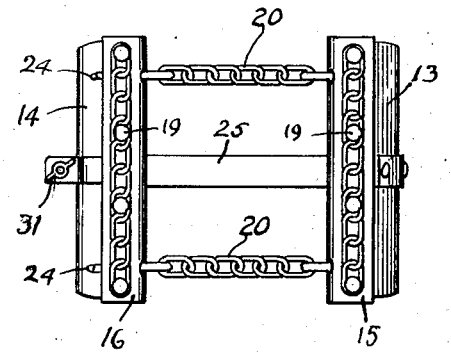
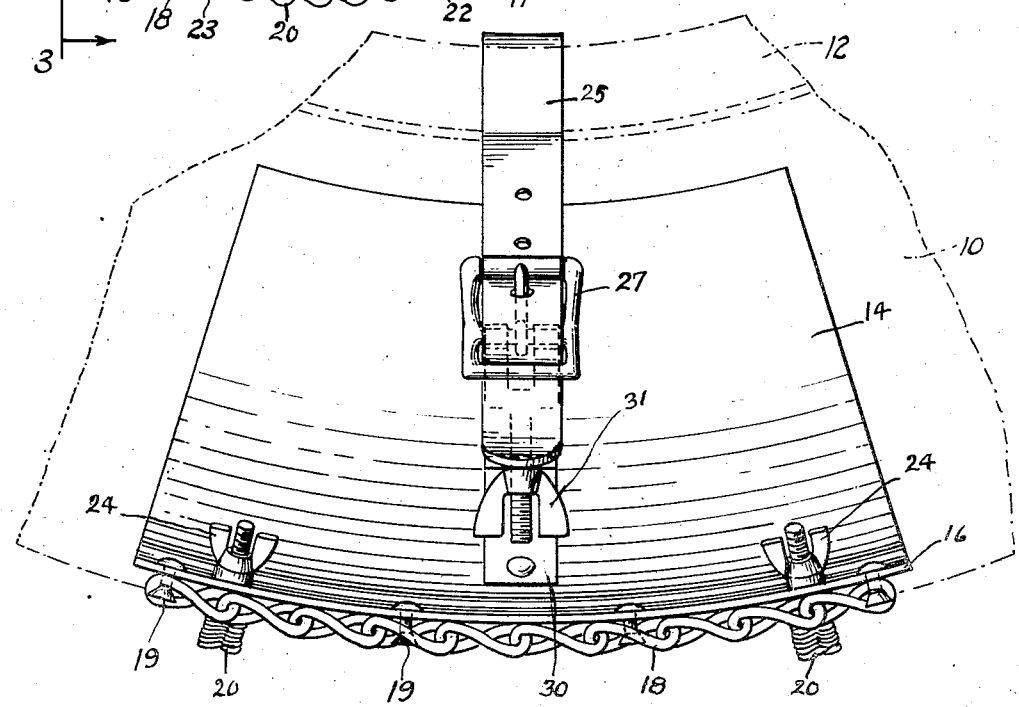
INVENTOR.
Alfred Peterson
BY Sheridan, Davis & Cargill
attys Patented Dec. 21, 1948

2,457,068

UNITED STATES PATENT OFFICE 2,457,068

ANTISKID CHAIN

Alfred Peterson, Wheaton, Ill.

Application April 16, 1947, Serial No. 741,843

4 Claims. (Cl. 152—237)

This invention relates to improvements in anti-skid means for motor vehicles.

One object of the invention is to provide an anti-skid device for a motor vehicle wheel that not only gives improved traction and better braking results on icy or slippery roadways but functions also to inhibit side skidding of the vehicle.

Another object of the invention is to provide an anti-skid device which can be positioned readily upon a wheel tire of a vehicle and attached in position by conventional means such as a strap and buckle arrangement, and which may thereafter be further and more firmly tightened in position about the tire, not only for reducing noise, but for restraining relative movement of the device with respect to the tire and for giving improved tractive and braking results and greater safety from lateral skidding.

Other objects of the invention relate to various features of construction and arrangement of parts which will be apparent from a consideration of the following specification and accompanying drawings wherein:

Figure 1 is an end elevation of a device embodying the present improvements showing it in position upon the tire of a vehicle wheel, the tire being shown in dotted lines and the wheel not being shown;

Fig. 2 is a bottom plan view of the device shown in Fig. 1; and

Fig. 3 is an elevation of the device looking to the right in Fig. 1.

In the drawing, 10 indicates a pneumatic tire carried upon a felly 11 of a vehicle wheel shown partially at 12 in Fig. 3. The improved device is adapted for use on spoked wheels or disc wheels having openings therein adjacent the rim and through which openings the attaching means of the device is adapted to pass. It will be understood that one or more of these devices may be attached to each wheel as the user elects.

The device shown in the drawings comprises an inner plate 13 and an outer plate 14 which are shaped to conform generally with a portion of the outer surface of the tire on which the device is to be used. The plates preferably are of steel and are duplicates, that is, they may be made by the same die or from the same pattern. The lower edges of the plates terminate in outwardly directed flanges 15 and 16, which flanges are disposed adjacent the tread 10a of the tire. Extending longitudinally of the inner and outer flange, are anti-skid chains, indicated at 17 and 18. The chains 17 and 18 are shown as being secured to the flanges by rivets 19. Other fastening means may be employed, if desired.

In addition to the chains 17 and 18, the device is shown provided with a pair of cross chains 20 which extend transversely of the tread of the tire. The inner ends of the chains 20 are shown as being permanently secured to the inner plate 13 as by means of the upset heads 21 of fastening members 22. The opposite ends of the chains 20 are provided with threaded members 23 which pass through apertures provided in the outer plate 14. Wing nuts 24 are shown in position on the threaded ends of the members 23. A strap or other flexible member 25 is shown riveted at one end, as at 26, to the inner plate 13, the strap being adapted to be passed from the inside of the tire over the felly 11 to the outside of the tire and into engagement with a buckle 27 or other convenient attaching means. The buckle 27 is shown attached to a threaded stud 28 which extends through an aperture in a flange 29 of a metallic ear 30 which is riveted to the plate 14.

When a device of the type described has been placed upon a tire and the strap 25 tightened to a convenient degree, it may be further tightened by means of the wing nut 31 of the stud 28. By means of the nut 31 the strap can be drawn very firmly about the tire and felly of the wheel. Likewise, by adjusting nuts 24 on the threaded members 23, compensation can be made in adjusting the device to tires of different diameter or tread widths. The nuts 24 likewise constitute means for supplementing the tightening action afforded not only by the buckle and strap arrangement but by that afforded by the nut 31. The cross chains 20, two of which are shown, but more of which may be used if desired, resist spinning of the wheel on slippery or icy pavements, whereas the side chains 17 and 18, which likewise contact the pavements or roadway, augment the tractive effect of the cross chains and inhibit lateral skidding.

Since the flanges 15 and 16 are of arcuate form corresponding in curvature to the curvature of a tire circumferentially they support the chains 17 and 18 in lengthwise contact with the roadway or pavement during each revolution of the wheel on which they are mounted. Where three or more of the improved devices are used on a wheel, substantial contact of such chains with the pavement is afforded and hence provides substantial protection against side skidding.

While I have shown and described a structure that is illustrative of the invention, various changes in the details of the structure may be resorted to within the scope and spirit of the invention defined by the following claims.

I claim:

1. An anti-skid device for a wheel-mounted vehicle tire comprising a pair of plates adapted to contact opposed side sections of the tire, said plates having laterally directed flanges at the outer edges curved in a circumferential direction in conformity with the circumference of the tire, an anti-skid chain extending along the outermost face of said flanges and secured thereto for contact with the roadway upon each rotation of the tire, transverse chains extending from plate to plate for spanning the tire tread, a flexible member secured to the inner of said plates and adapted to be passed through the vehicle wheel to the outer of said plates, a buckle for engaging said strap, and means comprising a threaded member securing the buckle to said outer plate and operable for tightening said strap after the same has been engaged by the buckle.

2. An anti-skid device for a wheel-mounted vehicle tire comprising a pair of side plates shaped to conform to opposed side walls of a tire section, cross chains secured to the plates and adapted to extend from plate to plate across the tread of the tire, a chain attached to the outer peripheral edge portion of each plate for contact with the roadway upon each rotation of the tire on which the device is mounted, and co-operating members each carried by one of the plates for securing the device to a wheel-mounted tire.

3. An anti-skid device for a wheel-mounted vehicle tire comprising a pair of side plates shaped to conform to opposed side walls of a tire section and each having an arcuate flange disposed adjacent the road contacting surface of the tire tread when the device is positioned on a tire, an anti-skid chain secured lengthwise to the outer face of each flange for rolling contact with the roadway during each rotation of the tire, a pair of cross chains extending from plate to plate across the tire tread and a pair of members each secured to one of said plates for securing the device to a tire.

4. An anti-skid device for a wheel-mounted vehicle tire comprising a pair of side plates shaped to conform to opposed faces of a tire section and each provided with an arcuate flange along the respective outer edge disposed adjacent the tire tread when the device is mounted on a tire, an anti-skid chain secured to each flange, a pair of cross chains provided with means securing the ends of the chains to the plates and adapted to extend across the tire tread from side to side thereof to contact the roadway, said securing means comprising individually operable tensioning means for each cross chain, and co-operating members on each plate for securing the device to a wheel-mounted tire.

ALFRED PETERSON.

REFERENCES CITED

The following references are of record in the file of this patent:

UNITED STATES PATENTS

| Number | Name | Date |
| --- | --- | --- |
| 1,273,930 | Shearer | July 30, 1918 |
| 1,289,194 | Knobloch | Dec. 31, 1918 |
| 1,351,992 | Blystad | Sept. 7, 1920 |
| 1,478,323 | Dean | Dec. 18, 1923 |
| 1,588,065 | Thomsen | June 8, 1926 |
| 2,186,528 | Hurst | Jan. 9, 1940 |